US008069207B2

(12) United States Patent
Tonegawa

(10) Patent No.: US 8,069,207 B2
(45) Date of Patent: Nov. 29, 2011

(54) APPARATUS, METHOD, AND PROGRAM FOR COMMUNICATION

(75) Inventor: Nobuyuki Tonegawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 347 days.

(21) Appl. No.: 11/360,442

(22) Filed: Feb. 24, 2006

(65) Prior Publication Data

US 2006/0200529 A1     Sep. 7, 2006

(30) Foreign Application Priority Data

Mar. 7, 2005  (JP) .................................. 2005-063156
Feb. 13, 2006  (JP) .................................. 2006-035696

(51) Int. Cl.
    *G06F 15/16*     (2006.01)
(52) U.S. Cl. ......................................................... 709/206
(58) Field of Classification Search ................... 709/206
    See application file for complete search history.

(56) References Cited

U.S. PATENT DOCUMENTS

| 6,493,105 | B1 |    | 12/2002 | Onuma |
| 6,934,288 | B2 | *  | 8/2005  | Dempo .......................... 370/394 |
| 2001/0013056 | A1 | * | 8/2001 | Mori et al. ..................... 709/206 |
| 2003/0234956 | A1 | * | 12/2003 | Salgado et al. .............. 358/1.15 |
| 2005/0071500 | A1 |   | 3/2005  | Tonegawa |
| 2006/0192990 | A1 |   | 8/2006  | Tonegawa |
| 2006/0212527 | A1 |   | 9/2006  | Tonegawa |
| 2006/0212528 | A1 |   | 9/2006  | Tonegawa |

FOREIGN PATENT DOCUMENTS

| JP | 10-150464 A |   | 6/1998  |
| JP | 2000-32202  |   | 1/2000  |
| JP | 2002324035 A | * | 11/2002 |

OTHER PUBLICATIONS

Englsh translation of JP 2002324035A.*
English translation (Human Translator) of JP2002324035A.*
J. Postel, The TCP Maximum Segment and Related Topics, RFC879 (Nov. 1983).*
U.S. Appl. No. 10/585,090, filed Jun. 30, 2006.
U.S. Appl. No. 10/503,221, filed Aug. 2, 2004.

* cited by examiner

*Primary Examiner* — Phuoc Nguyen
*Assistant Examiner* — June Sison
(74) *Attorney, Agent, or Firm* — Fitzpatrick, Cella, Harper & Scinto

(57) ABSTRACT

A communication apparatus according to the present invention includes: upper limit setting unit, adapted to set a transmission upper limit which defines an upper limit of data size of mail data to be transmitted in a single e-mail; image data acquiring unit, adapted to acquire image data to be attached to the e-mail; transmission upper limit updating unit, adapted to update the transmission upper limit by subtracting a predetermined margin from the transmission upper limit; data dividing unit, adapted to divide the image data acquired by said image data acquiring means into pieces of image data corresponding to the transmission upper limit updated by the transmission upper limit updating means; divided mail data generating unit, adapted to generate divided mail data containing each of the pieces of image data divided by said data dividing means; and transmission unit, adapted to repeatedly transmit the divided mail data so as to transmit the e-mail to which the image data is attached.

9 Claims, 8 Drawing Sheets

FIG. 5

| | |
|---|---|
| 400 | X-Priority: 1 (Highest) |
| 401 | Date: Wed, 31 Dec 2003 17:17:14 +0900 |
| 402 | From: <ifax@copy1.xyz.co.jp> |
| 403 | Subject: =?ISO-2022-JP?B?GyRCO3FOQUF3SVUbKEI=?= |
| 404 | To: =?ISO-2022-JP?B?GyRCIUozdCFLGyhCQUJD?= < ifax@abc.co.jp> |
| 405 | Cc: =?ISO-2022-JP?B?GyRCMUQ2SBsoQjMbJElyXRsoQg==?= <ifax@copy2.xyz.co.jp>, |
| 406 | =?ISO-2022-JP?B?GyRCMUQ2SBsoQjIbJElyXRsoQg==?= <ifax@copy3,xyz.co.jp> |
| 407 | Bcc: =?ISO-2022-JP?B?GyRCMUQ2SBsoQjMbJElyXRsoQg==?= <ifax@copy1.xyz.co.jp> |
| 408 | Message-Id: <20031231133647: TxNo. 0580. 01@copy3.xyz.co.jp> |
| 409 | Mime-Version: 1.0 |
| 410 | Content-Type: message/partial; number=1; total=3; |
| 411 | id="20041110104508. 0000. TxNo. 0105@copy3.xyz.co.jp" |
| 412 | |
| 413 | Priority: 1 (Highest) |
| 414 | Date: Wed, 31 Dec 2003 17:17:14 +0900 |
| 415 | From: <ifax@copy1.xyz.co.jp> |
| 416 | Subject: =?ISO-2022-JP?B?GyRCO3FOQUF3SVUbKEI=?= |
| 417 | To: =?ISO-2022-JP?B?GyRCIUozdCFLGyhCQUJD?= < ifax@abc.co.jp> |
| 418 | Cc: =?ISO-2022-JP?B?GyRCMUQ2SBsoQjMbJElyXRsoQg==?= <ifax@copy2.xyz.co.jp>, |
| 419 | =?ISO-2022-JP?B?GyRCMUQ2SBsoQjIbJElyXRsoQg==?= <ifax@copy3.xyz.co.jp> |
| 420 | Bcc: =?ISO-2022-JP?B?GyRCMUQ2SBsoQjMbJElyXRsoQg==?= <ifax@copy1.xyz.co.jp> |
| 421 | Message-Id: <20031231133647. TxNo. 0580. 01@copy3.xyz.co,jp> |
| 422 | Mime-Version: 1.0 |
| 423 | Content-Type: multipart/mixed; boundary ="AHMOALBJDADADADCDADAAAAOB" |
| 424 | |
| 425 | --AHMOALBJDADADADCDADAAAAOB |
| 426 | Content-Type: text/plain; charset="ISO-2022-JP" |
| 427 | |
| 428 | "$B$*@$OC$K$J$C$F$*$j$^$9!#" (B |
| 429 | "$B$40MMj$N; qNA$rAw$j$^$9!#" (B |
| 430 | |
| 431 | --AHMOALBJDADADADCDAAAAAOB |
| 432 | Content-Type: image/tiff; name ="Image. tif"; application =faxbx |
| 433 | Content-Transfer-Encoding: base64 |
| 434 | Content-Disposition: attachment; filename="Image.tif" |
| 435 | |
| 436 | SUkqAAgAAAARAP4ABAABAAAAgAAAAABAwABAAAAwAYAAAEBAwABAAAAgAgAAAIBAwABAAAAAQAA |
| 437 | AAMBAwABAAAAAwAAAAYBAwABAAAAAAAAoBAwABAAAAAgAAABEBBAABAAAA6gAAABIBAwABAAAA |
| 438 | AQAAABUBAwABAAAAAQAAABYBBAABAAAAgAgAABcBBAABAAAAFIAAABoBBQABAAAA2gAAABsBBQAB |
| 439 | ... |
| 440 | ... |
| 441 | ... |
| 442 | eHlv+V8Uu/sOb4ri6KLe8wdXdfFlbntmEABonuluxl/nQPtBIt/ROCLqoiVRH3tzol0Ud8rHfueu |
| 443 | DnvXuREzCAA0z3XNvuMpcD9ldKgXEU8RHFEUdHdeF8Wd8sldj3BOvQMxgwBAAARAAAARAAAQ= |

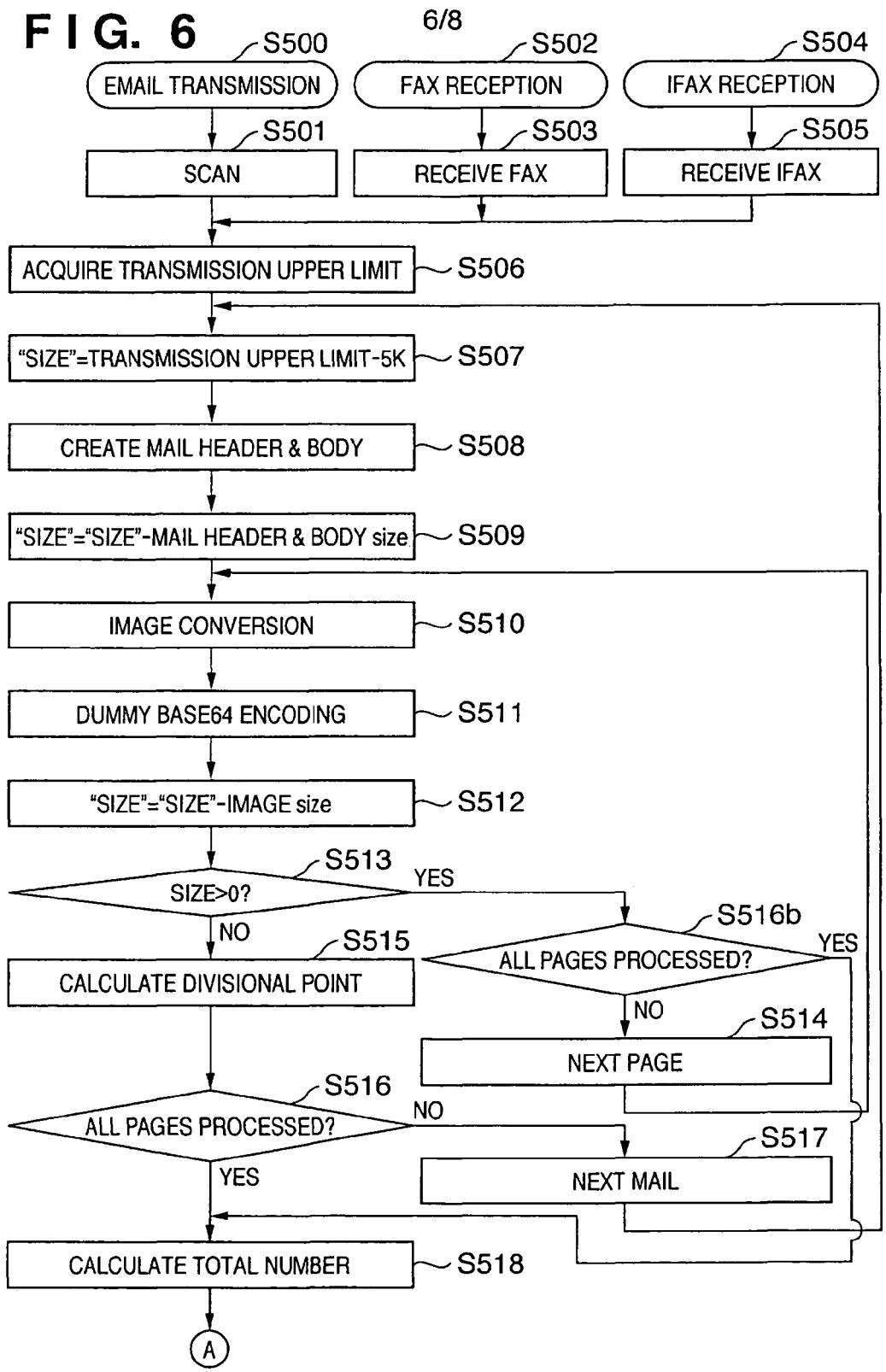

APPARATUS, METHOD, AND PROGRAM FOR COMMUNICATION

FIELD OF THE INVENTION

The present invention relates to a communication apparatus, method, and program which transmit, by e-mail or the like, images and/or other data read by a scanner.

BACKGROUND OF THE INVENTION

Recently, along with the spread of computers and networking of information, e-mail used to transmit and receive character information via networks has come into wide use.

Files in various formats can be attached to e-mail in addition to a mail body consisting of character information. By taking advantage of this feature, Internet FAX (hereinafter abbreviated to IFAX) used to transmit and receive images as attached TIFF (Tag Image File Format) files has come into wide use.

An IFAX transmitter converts image data read by a scanner into TIFF and transmits the converted image data to an IFAX receiver. The IFAX receiver reproduces the TIFF image data from the received data and prints the TIFF image data.

Various methods are available to transmit image data. For example, Japanese Patent Application Laid-Open No. 2000-32202 discloses a technique for transmitting multiple pages of image data by dividing them on a page by page basis.

Also available is RFC (Request for comments) 2045 (issued by the Internet Engineering Task Force—IETF). RFC 2045 describes a method for dividing one e-mail data into multiple pieces of e-mail using "message/partial" as MIME Content-Type and combining the multiple pieces of divided e-mail data into one e-mail data.

Furthermore, RFC 2046 stipulates that an SMTP server which receives and transfers messages must add a "Received:" field containing a "timestamp" and "reception information" to the head of the received messages as path information.

If e-mail is transmitted with a large file attached, intermediary mail servers may be heavily loaded, resulting in a delay in mail delivery. If things get worse, the entire mail delivery service will be stopped. Thus, mail servers are often set not to receive e-mail which is larger than a certain size.

Consequently, if a large volume of image data is transmitted via IFAX, intermediary mail servers may cause delivery error due to the large data size. For example, when transmitting e-mail with an attached file from a PC, it is relatively easy to check the data size of the attached file. In the case of IFAX, however, it is difficult to estimate data size when scanning and transmitting images. This may cause delivery errors frequently.

When transmitting a high-resolution image or color image, even a single page of such an image may involve large data size and delivery errors cannot be avoided even with the technique disclosed in Japanese Patent Application Laid-Open No. 2000-32202.

Even if e-mail is transmitted in the message/partial format described in RFC 2045 and RFC 2046 by being divided into blocks of a predetermined size, a problem described below with reference to FIG. 8 arises.

Referring to FIG. 8, outgoing mail data created for transmission of e-mail consists of a mail header 604, mail body 605, and attached TIFF file 606. The mail body 605 does not have to exist.

Upon receiving the outgoing mail data from a transmitter, a mail server adds a "Received:" field 603 to the head of the outgoing mail data according to RFC 2046. When the outgoing mail data is transferred to another mail server, another "Received:" field 602 is added to the head of the outgoing mail data. If this is repeated, "Received:" fields such as 601 and 600 are piled up, ever enlarging the outgoing mail data.

Thus, even if outgoing mail data are transmitted after being divided into blocks of a predetermined size, their size increases as they pass mail servers on the route. Consequently, even if e-mail is transmitted keeping within data size limits set for mail servers, the limits are exceeded in midcourse, resulting in a delivery error of a mail server.

SUMMARY OF THE INVENTION

It is a feature of the present invention to solve the conventional problems.

Also, it is a feature of the present invention to provide a communication apparatus, method, and program capable of transmitting image data divided into multiple parts in such a way that data size limits set for mail servers will not be exceeded.

According to an aspect of the present invention, there is provided with a communication apparatus comprising:

upper limit setting unit, adapted to set a transmission upper limit which defines an upper limit of data size of mail data to be transmitted in a single e-mail;

image data acquiring unit, adapted to acquire image data to be attached to the e-mail;

transmission upper limit updating unit, adapted to update the transmission upper limit by subtracting a predetermined margin from the transmission upper limit:

data dividing unit, adapted to divide the image data acquired by the image data acquiring means into pieces of image data corresponding to the transmission upper limit updated by the transmission upper limit updating means;

divided mail data generating unit, adapted to generate divided mail data containing each of the pieces of image data divided by the data dividing means; and transmission unit, adapted to repeatedly transmit the divided mail data so as to transmit the e-mail to which the image data is attached.

According to another aspect of the present invention, there is provided with a communication method comprising:

an upper limit setting step of setting a transmission upper limit which defines an upper limit of data size of mail data to be transmitted in a single e-mail;

an image data acquiring step of acquiring image data to be attached to the e-mail;

a transmission upper limit updating step of updating the transmission upper limit by subtracting a predetermined margin from the transmission upper limit;

a data dividing step of dividing the image data acquired in the image data acquiring step into pieces of image data corresponding to the transmission upper limit updated in the transmission upper limit updating step;

a divided mail data generating step of generating divided mail data containing each of the pieces of image data divided in the data dividing step; and a transmission step of repeatedly transmitting the divided mail data so as to transmit the e-mail to which the image data is attached.

This summary of the invention does not necessarily describe all necessary features so that the invention may also be a sub-combination of these described features.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a diagram illustrating divided mail data;

FIG. 6 is a first flowchart illustrating operation of divided mail transmission;

DETAILED DESCRIPTION OF THE PREFERRED EMBODIMENTS

Embodiments of the present invention will be described below with reference to the drawings. The individual embodiments described below will be useful in understanding various concepts of the present invention including superordinate concepts, subordinate concepts, and lower subordinate concepts.

It is to be understood that scope of the present invention is defined only by the appended claims, and is not limited to any particular embodiment described below. Also, it should be noted that not all combinations of the features described in the embodiments are absolutely necessary for the solution according to the present invention.

<Network Configuration>

Figure 1:
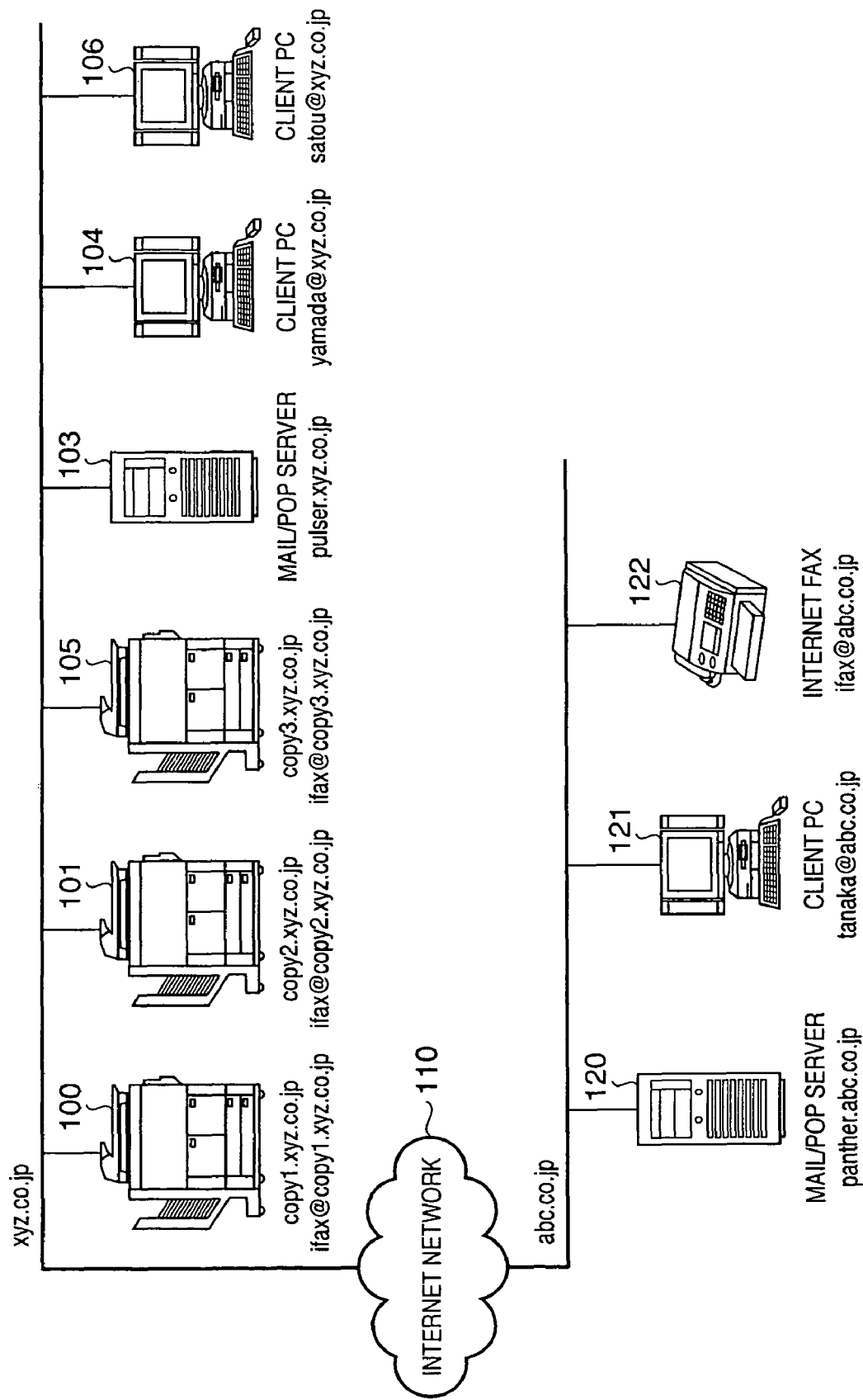
FIG. 1 is a diagram showing a network topology used for an embodiment of the present invention.

FIG. 1 is a diagram showing a network topology of a communication apparatus according to an embodiment of the present invention. Reference numerals 100, and 101 denote MFPs (Multi Function Printers) which are equipped with a scanner, printer, and the like and have a copying function, facsimile function, and printer function for printing data created on a computer.

The MFP 100 and MFP 101 are connected to a network with a domain mane of xyz.co.jp, through which they are connected with a plurality of computers and networking devices such as a mail/POP server 103 and client PC 104.

This network is further connected to the Internet network 110 which spreads worldwide as well as to a network identified by "abc.co.jp" which is connected with a mail/POP server 120, client PC 121, Internet FAX 122, etc.

The MFP 100 has been assigned a host name copy1.xyz.co.jp and an e-mail address "ifax@copy1.xyz.co.jp". The MFP 101 has been assigned a host name "copy2.xyz.co.jp" and an e-mail address "ifax@copy2.xyz.co.jp".

General-purpose e-mail software has been installed on the PC 104. A mail address "yamada@.xyz.co.jp" has been assigned to the PC 104. Similarly, a mail address "satou.xyz-.co.jp" has been assigned to a PC 106.

The mail/POP server 103 combines the functions of a mail server and POP server and so does the mail/POP server 120.

Suppose e-mail is transmitted from the client PC 104 to an address of "tanaka@abc.co.jp". E-mail data created by the e-mail software on the client PC 104 is delivered by the mail server 103 using SMTP (Simple Mail Transfer Protocol). The e-mail data is delivered from the mail server 103 to the mail server 120 via the Internet network 110 using SMTP and stored in a mail box of "tanaka@abc.co.jp".

General-purpose e-mail software has been installed on the client PC 121 as well. The client PC 121 monitors the mail box of "tanaka@abc.co.jp" on the POP server 120 for any e-mail at predetermined intervals using POP3 (Post Office Protocol-Version 3). If mail has arrived at the POP server 120, the client PC 121 receives the mail data.

When "tanaka@abc.co.jp" on the client PC 121 sends mail to "yamada@xyz.co.jp" on the client PC 104, the e-mal data follows the opposite route. The mail data created by the general-purpose e-mail software on the client PC 121 is sent to the mail server 103 via the mail server 120 and stored in a mail box of "yamada@xyz.co.jp" on the POP server 103. The client PC 104 acquires the mail data from the mail box of "yamada@xyz.co.jp" via POP3.

The MFP 100 and MFP 101 have an Email transmission mode intended to send images received by FAX and IFAX reception functions and monochrome/color images read by a scanner to ordinary e-mail addresses. The MFP 100 and MFP 101 also have an IFAX transmission mode intended for transmission to devices compliant with IFAX standards. SMTP and POP3 are used for data transmission and reception. The MFP 100 and MFP 101 operate in a manner similar to the transmission and reception of e-mail performed by the client PC 104 and client PC 121 described above.

In the Email transmission mode, color images read by a scanner can be transmitted as JPEG format or PDF (Portable Document Format) format files. On the other hand, monochrome images can be transmitted as TIFF or PDF images.

When data is transmitted to the mail address of "yamada@xyz.co.jp", the client PC 104 can receive the mail via POP3 and display it using a general-purpose image viewer. In the IFAX transmission mode, images read by a scanner is transmitted as images in TIFF format compliant with RFC 2301 to the MFP 100, MFP 101, and/or Internet FAX 122 compliant with IFAX standard via SMTP and POP3.

The image data transmitted by the scanner of the transmitter or using a FAX or IFAX transmission function are received by a remote receiver and printed on a printer.

<Configuration of MFP 100>

Figure 2:
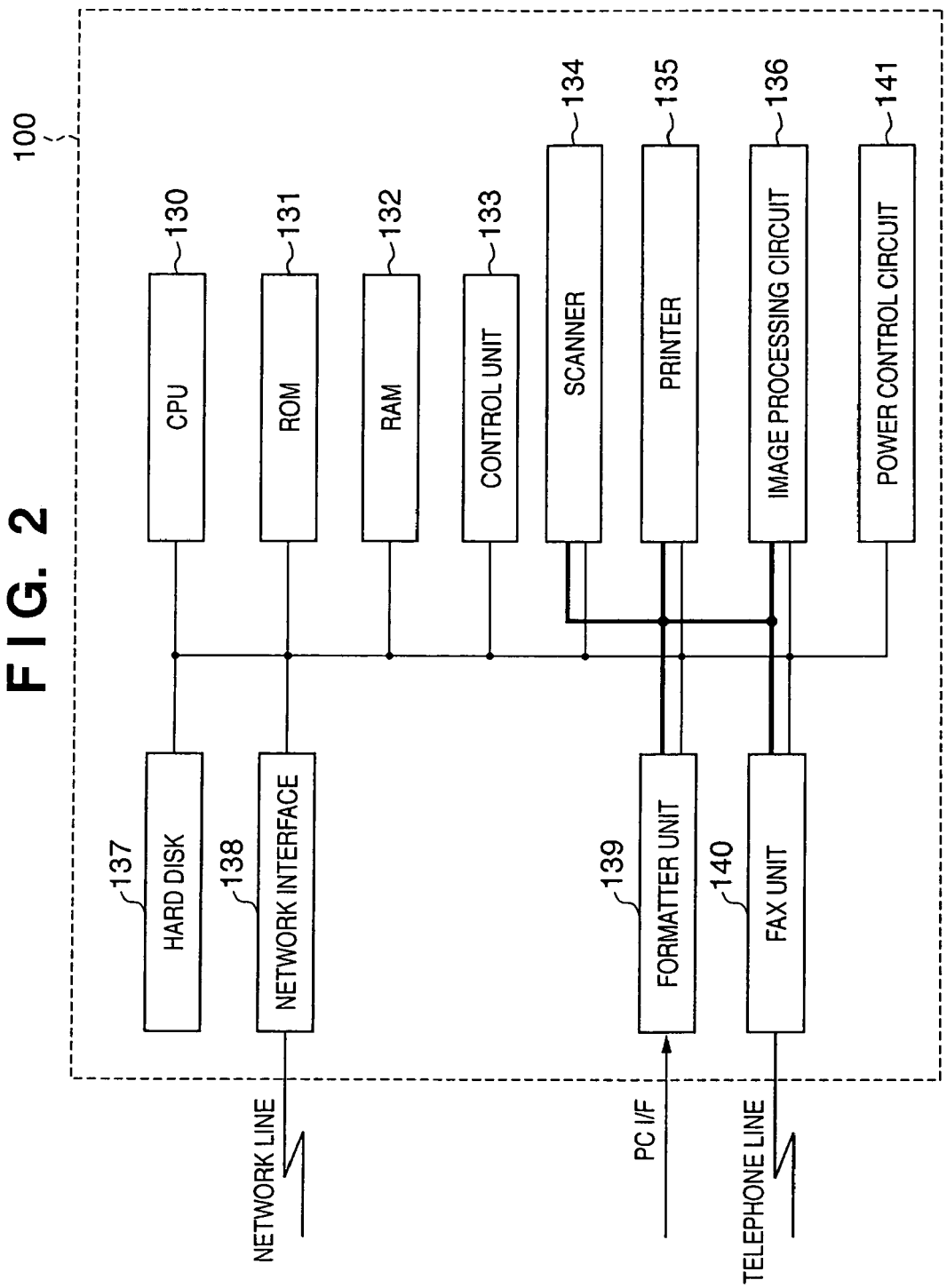
FIG. 2 is a block diagram showing a system configuration according to the embodiment.

FIG. 2 is a diagram showing a configuration of the MFP 100. In FIG. 2, a CPU 130 is a control circuit which controls an entire system using programs stored in a ROM 131 as well as using a RAM 132.

A control unit 133 contains LCD display panel and hardware keys such as a start key and numeric keypad. Buttons are displayed on an LCD by software and a touch of a user's finger on a button is detected.

A scanner 134 converts image data of a source document into electrical data by photon-electron conversion. The source document is transported from a document feeder to a platen glass, a lamp is turned on and a scanner unit starts to move and scan the source document.

Reflected light from the source document is led to a CCD image sensor by mirrors and lenses and converted into an electric signal, which subsequently is converted into digital data by an A/D conversion circuit. Once the source document has been read, it is ejected from the platen glass.

A printer unit 135 is a circuit which prints electronic image data on recording paper. The printer unit 135 emits a laser beam from a laser emitter (not shown) according to the digital image data. The laser beam is directed at a photoconductive drum on which a latent image is formed corresponding to the laser beam.

Developing powder is applied to the latent image on the photoconductive drum by a developing unit, recording paper is supplied to a transcribe unit from a paper feed tray in synchronization with the start of irradiation with the laser beam, and the developing powder is transferred from the photoconductive drum to the recording paper.

The recording paper with the developing powder attached is transported to a fixing unit. The developing powder is fixed on the recording paper by heat and pressure applied by the fixing unit. After passing through the fixing unit, the recording paper is ejected by an ejecting roller. A sorter sorts the recording papers by storing them in appropriate bins.

An image processing circuit 136 is equipped with a large-capacity image memory, image rotation circuit, resolution changing circuit as well as MH, MR, MMR, JBIG, JPEG, and other coding/decoding circuits. It can perform various image processing including shading, trimming, and masking.

A hard disk 137 is a large-capacity recording medium connected via a SCSI, USB, or other interface. An MO or other recording medium may be used in addition to, or instead of, the hard disk. It is possible to register a number of destinations of e-mail (e-mail addresses), which are used to send e-mails by the MFP. 100, on the hard disk 137.

A network interface 138 provides a network data link for connection with Ethernet (registered trademark)(such as 10BASE-T and 100BASE-T), Token Ring, or other network circuits.

A formatter unit 139 is equipped with PC interface circuits such as an IEEE 1284-compliant parallel interface and USB. It creates image data from PDL (Page Description Language) data received from a personal computer via a PC interface circuit or network interface circuit and performs image processing in the image processing circuit 136. Also, the formatter unit 139 performs rendering to print the image data on the printer 135.

A fax unit 140 is a fax interface circuit which is connected to a telephone line and composed of an NCU (Network Control Unit), MODEM (MOdulator/DEModulator), and other circuits.

The MFP 100 processes image data read by the scanner 134, in the image processing circuit 136 and transmits the image data to another FAX machine. Also, it receives data from another FAX machine, processes them in the image processing circuit 136, and prints them using the printer 135.

The scanner 134, printer 135, image processing circuit 136, formatter unit 139, and fax unit 140 are connected to a high-speed video bus different from a CPU bus from the CPU 130 such that they can transfer image data at high speed.

Image data read by the scanner 134 is processed by the image processing circuit 136 and printed using the printer 135, thereby implementing a copying function.

The MFP 100 has a Send function for transmitting image data read by the scanner 134 and processed by the image processing circuit 136 to a network via a network interface. Also, it has an IFAX function for creating images in the image processing circuit 136 according to RFC 2301 and transmitting and receiving data via an e-mail protocol.

A power control circuit 141 controls power consumption of the MFP 100. It can reduce power consumption of equipment by lowering heater temperature and turning off the circuits not in use.

The power control circuit provides the MFP 100 with two sleep states: a SLEEP1 state in which the control unit 133 and a fixing temperature regulating circuit of the printer 135 are turned off, and a SLEEP2 state in which almost all circuits including the CPU 130 are turned off. The SLEEP1 state consumes more power than the SLEEP2 state, but makes the MFP 100 ready to resume operation at a start command more quickly. That is, the SLEEP1 state provides quick responsiveness. In the SLEEP2 state, the CPU 130 stops, and so does software control of the MFP 100.

Upon communication request from the network interface 138, formatter unit 139, or fax unit 140 or at the press of a power saving key 311 (see FIG. 4) on the control unit 133, the CPU 130 starts up and changes from SLEEP2 state to SLEEP1 state.

When an image is formed based on data received via an external interface and the image is inputted in the printer 135, the CPU 130 comes out of the SLEEP1 state and enters a standby state.

When a predetermined time elapses in standby state after completion of a printing process or when the power saving key 311 is pressed in standby state, the MFP 100 enters SLEEP1 state. When a predetermined time elapses in SLEEP1 state, the MFP 100 enters SLEEP2 state.

<Configuration of Network Protocols>

Figure 3:
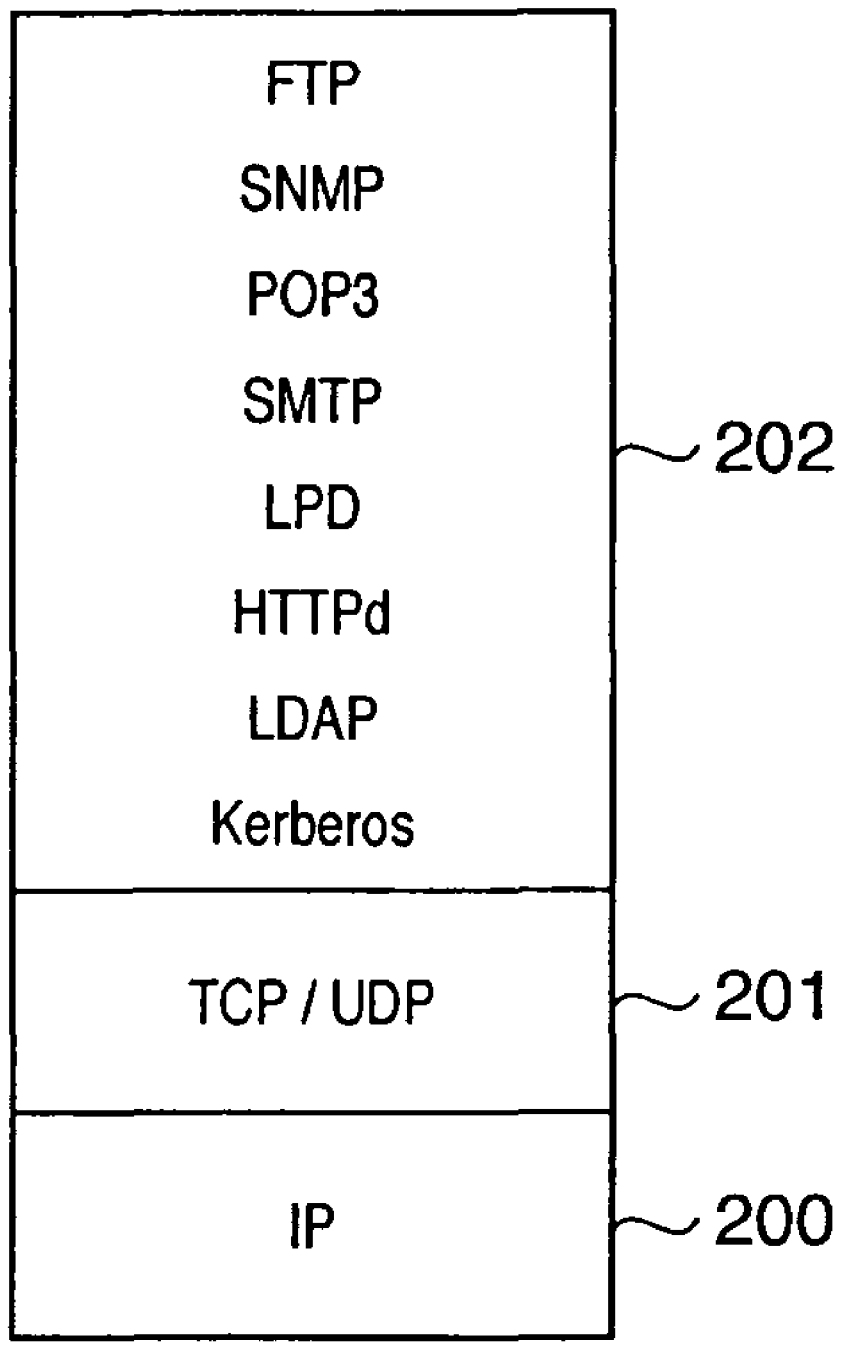
FIG. 3 is a diagram showing a protocol configuration according to the embodiment.

FIG. 3 is a diagram illustrating network protocols of the MFP 100. The network protocols are roughly grouped into three layers. Specifically, they are composed of IP (Internet Protocol) 200, TCP/UDP (Transmission Control Protocol/User Datagram Protocol) 201, and protocols 202 in the Application layer.

IP 200 is the Internet Protocol layer which provides services of delivering messages from source hosts to destination hosts in conjunction with relay nodes such as routers. IP 200 runs a routing function of managing addresses of sources which transmit data and addresses of destinations which receive the data and determines, based on address information, which route in the network should be used to deliver data to each destination host.

TCP/UDP 201 is the Transport layer which provides services of delivering messages from source application processes to destination application processes. TCP provides connection-oriented services which guarantee high reliability of communication while UDP provides connectionless services which do not guarantee reliability.

There are a plurality of Application layer protocols 202 including FTP (File Transfer Protocol) which stipulates file transfer services and SNMP which is a network management protocol. The Application layer also contains LPD which is a server protocol for printing by printers, HTTPd which is a protocol for WWW (World Wide Web) servers, SMTP (Simple Mail Transfer Protocol) which is an e-mail transfer protocol, POP3 (Post Office Protocol-Version 3) which is a mail download protocol, and LDAP (Lightweight Directory Access Protocol) used to access directory databases which manage users' e-mail addresses. Also, the Application layer contains Kerberos authentication protocols defined by RFC 1510.

<Example of Transmission Setting Screen>

Figure 4:
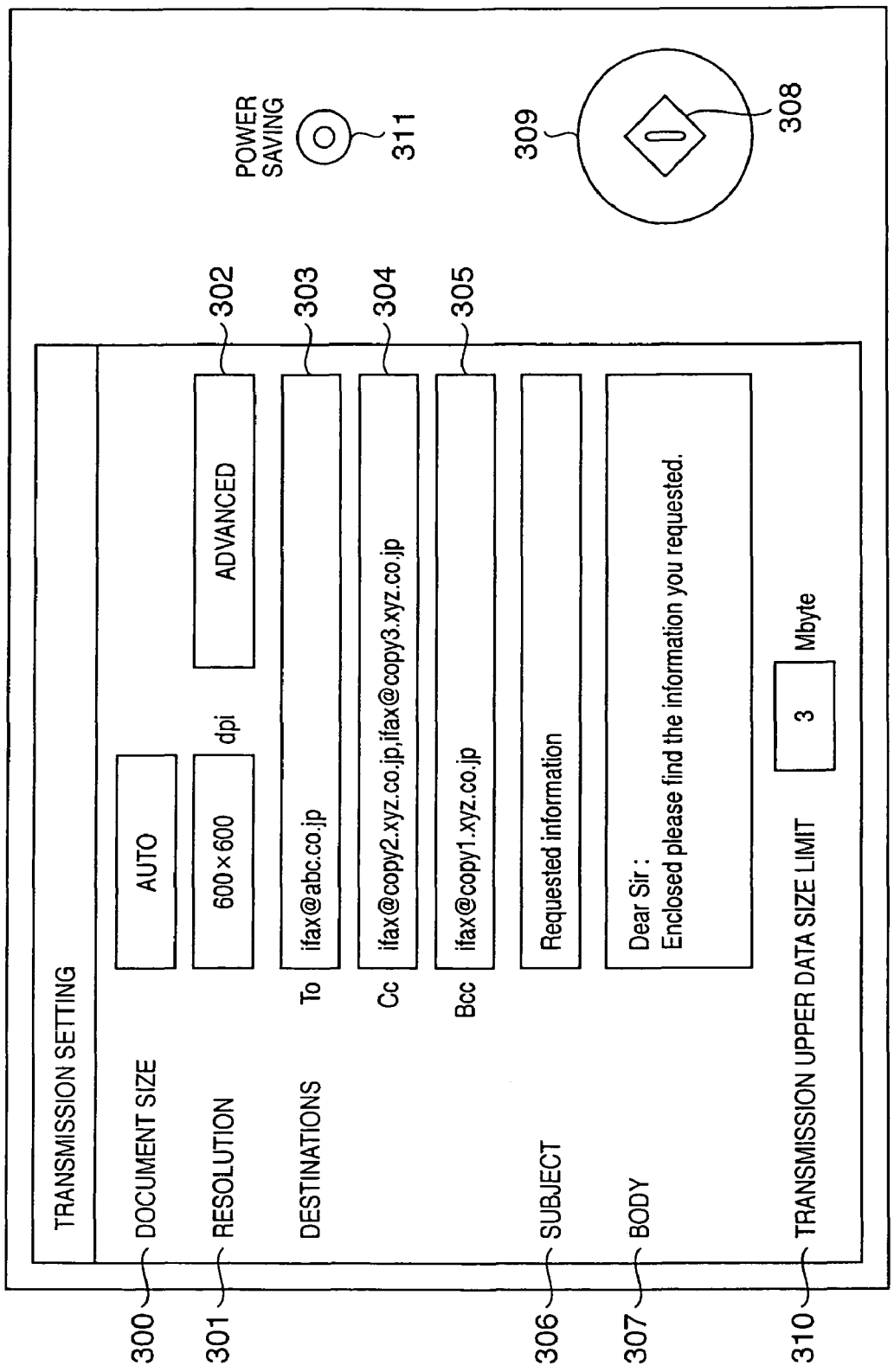
FIG. 4 is a diagram showing a user interface for transmission setting.

FIG. 4 shows a transmission setting screen of the control unit 133 which is displayed when image data read by the scanner 134 is sent by e-mail.

Document Size 300 specifies the size of a source document read by the scanner 134. Paper sizes including A3, A4, A5, B4, B5, 11×17, LTS, and STMT as well as orientation of the paper can be specified. Currently, Document Size 300 is set to AUTO, meaning that values detected by a document sensor of the scanner 134 are used.

Resolution 301 specifies resolution at which the scanner 134 reads images. Available values include 200×100, 200×200, 200×400, 300×300, 400×400, and 600×600 dpi. Resolution 301 defaults to 200×200, but is currently set to 600×600 dpi.

Advanced 302 specifies details of scanning including scanning density, document type, duplex scanning, continuous scanning, and image quality.

A To field 303 allows a destination of e-mail to be selected from an address book. Similarly, destinations to be entered in a Cc field 304 and Bcc field 305 can be selected from the address book.

Incidentally, in some cases, the maximum number of destinations is limited to 256, meaning that the total number of destinations which can be entered in the destination fields 303, 304, and 305 is 256. Any destination in excess of this number cannot be entered.

Subject 306 and Body 307 are used to enter the subject and body of e-mail. When any of these fields is selected, a soft keyboard is displayed, allowing a character string to be entered.

Transmission Upper Data Size Limit 310 is used to enter a maximum allowable size of e-mail data to be transmitted (upper data size limit of mail data which can be transmitted). Users can set the limit at any positive value. Any e-mail data exceeding this limit are transmitted after being divided into multiple pieces, and consequently no mail larger than this limit is transmitted. If this field is set to ,"0" no limit is imposed, and thus e-mail is not divided.

Although the size of transmitted mail data is limited according to this embodiment, image size of a TIFF file or JPEG file to be transmitted may be limited alternatively.

Although the upper limit can be set for each transmission using Transmission Upper Data Size Limit 310 on the transmission setting screen, if it is not necessary to set an upper limit for each transmission, the upper limit may be set in the ROM 131 as part of equipment information management. If the upper limit varies with the destination, it may be set for each destination in the address book.

A start key 309 is a hardware key provided beside the control unit 133. A press of this key starts the scanner 134 to read and transmit an image. A blue/red LED 308 is mounted in the center of the start key 309. If no destination is specified, the red LED illuminates, indicating to the user that the scanner 134 does not operate even if the start key 309 is pressed. If any destination is specified, the blue LED illuminates, indicating to the user that the scanner is ready to operate.

The power saving key 311 is a hardware key. If it is pressed when the MFP 100 is in standby state, the power control circuit 141 puts the MFP 100 in sleep state. If it is pressed when the MFP 100 is in sleep state, the power control circuit 141 puts the MFP 100 in standby state.

<Example of Divided Mail Data>

FIG. 5 shows an example of divided mail data which is transmitted with the transmission settings in FIG. 4. In FIG. 5, 400 to 411 contain a mail header used to deliver the divided mail. The From field 402 contains a mail address of the MFP 100.

It is assumed, for example, that this is the first e-mail data of mail divided into three parts. Thus, the Subject field 403 contains data obtained by adding "[⅓]" to the character string entered in Subject 306 and converting the character string into encoded-word format defined by RFC 2047.

The To field 404, Cc field 405 and 406, and Bcc field 407 contains the destination data entered in the To field 303. Cc field 304, and Bcc field 305, respectively, and converted into encoded-word format.

'MIME Content=Type: message/partial;' in 410 indicates that the mail is divided mail and 'number=1; Total=3' indicates that this is the first e-mail data of mail divided into three parts.

'id="20041110104508. 0000. TxNo. 0105@copy3.xyz.co.jp"' in 411 is a division id number of divided mail consisting of a date, time, transmission receipt number which is incremented by one at the time of each transmission, and domain name of the transmitter. Pieces of mail with the same division id number are regarded to be divided parts of the same mail and it is possible to restore the original mail data by extracting mail data with the same division id number and combining them in the order indicated by 'number'.

Fields 413 to 443 contain the substance of the divided mail. Fields 413 to 423 contain a header of the mail before the division. This header is similar to the header contained in 400 to 411, but Subject information in 416 is data obtained by converting the character string itself entered in Subject 306 into encoded-word format.

<Division and Transmission of E-mail>

Figure 7:
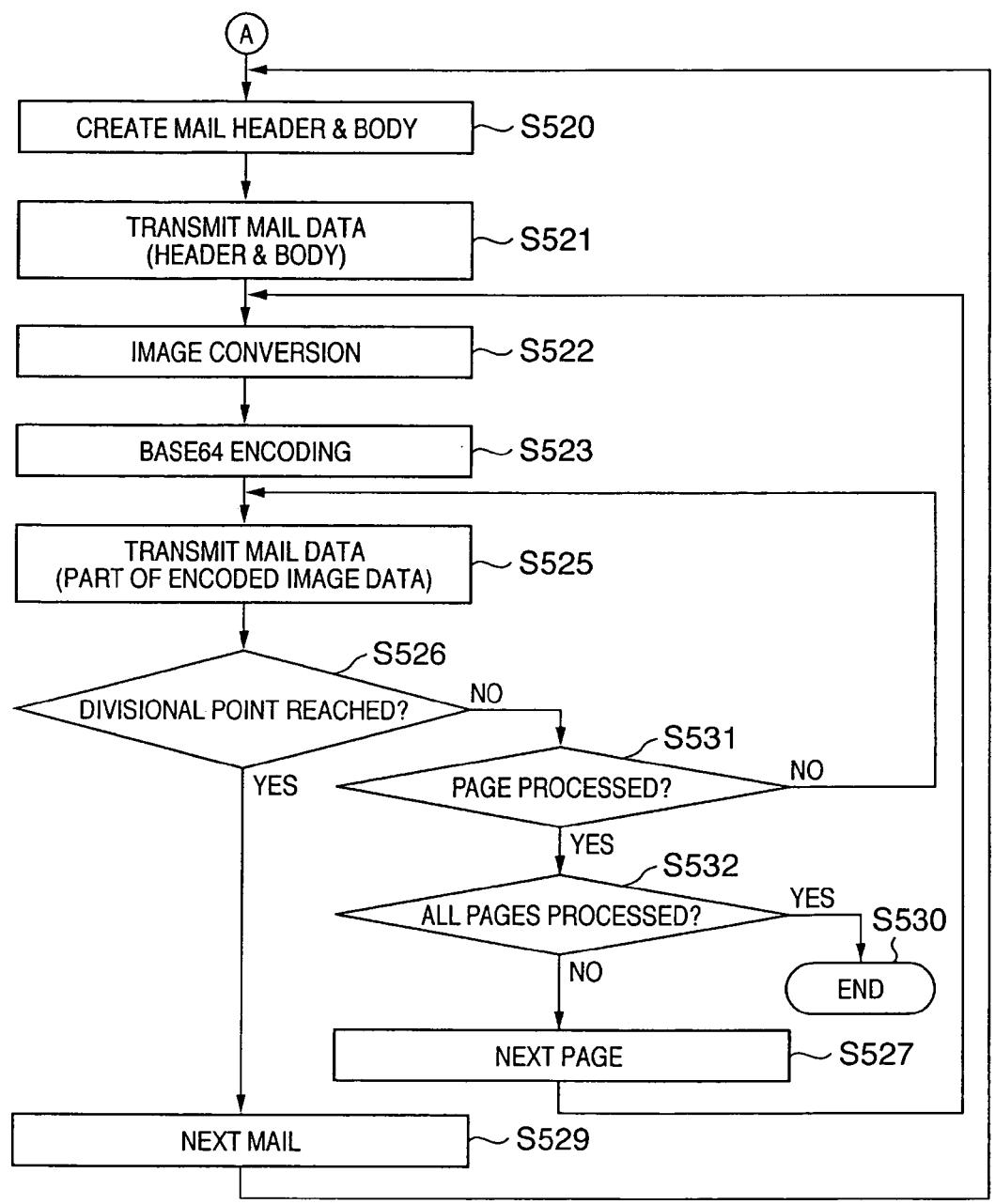
FIG. 7 is a second flowchart illustrating operation of divided mail transmission.
Figure 8:
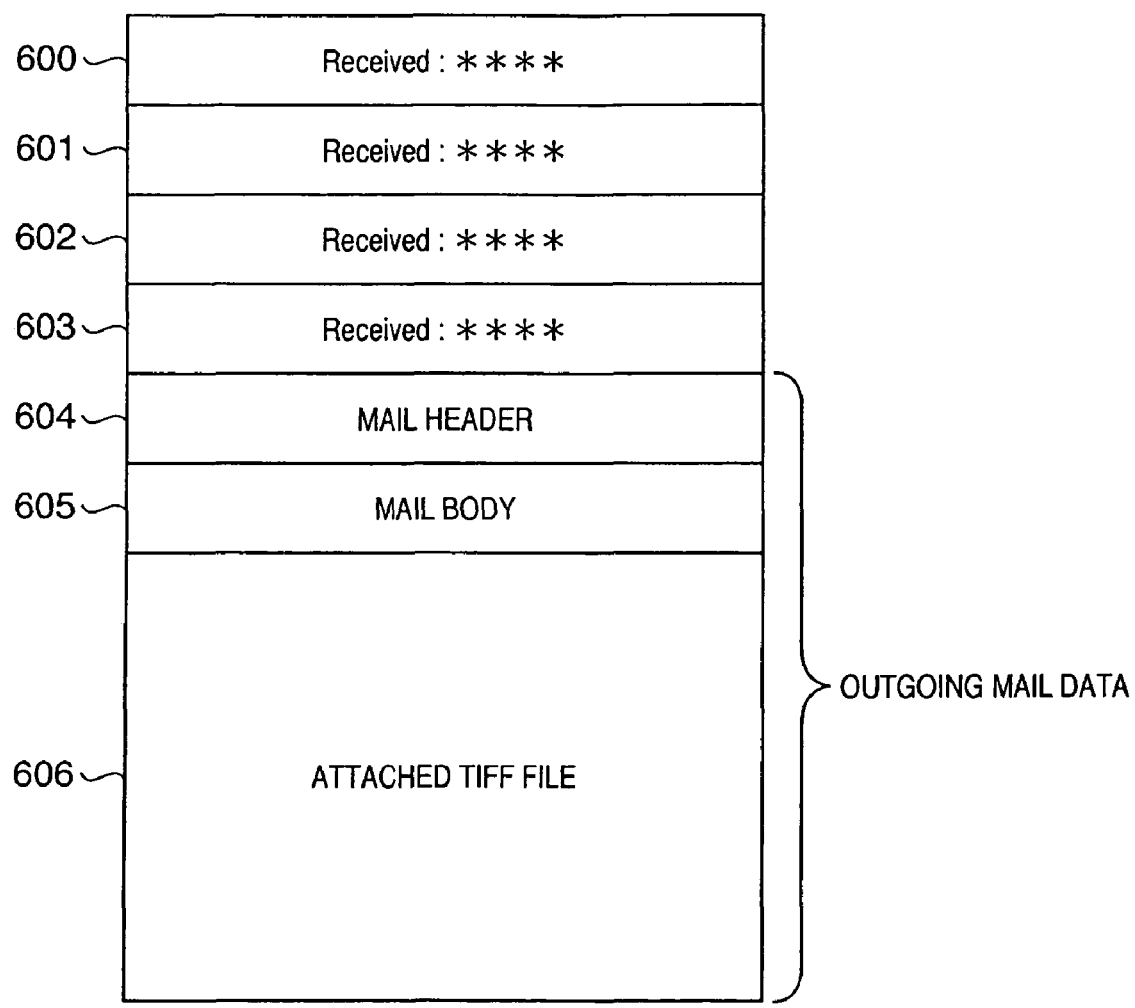
FIG. 8 is a diagram illustrating mail data according to a conventional technique.

FIGS. 6 and 7 are flowcharts illustrating procedures for transmitting an image read by the scanner 134 or an image received by FAX or IFAX reception function, by dividing it into e-mail data of a specified size. Incidentally, the e-mail transmission of an image received by FAX or IFAX reception function means transferring e-mail data received by a FAX or IFAX machine to another machine.

When various parameters are set on a transmission screen in FIG. 4 and the start key 309 is pressed, an Email transmission process in Step S500 is started.

In Step S501, the scanner 134 is operated and a mounted source document is converted into electronic data. On the other hand, if a FAX arrives via a telephone line, a FAX reception process in Step S502 is started and FAX images are formed by controlling the FAX unit 140 in Step S503. Similarly, if e-mail arrives via SMTP and POP3, an IFAX reception process in Step S504 is started and FAX images are formed in Step S505.

If image data is created by the scanner 134, the value set as Transmission Upper Data Size Limit 310 is used as a transmission upper limit in Step S506. If image data is received by the FAX or IFAX function, a setting made on a transfer setting screen (not shown) is used.

In Step S507, the value obtained by subtracting 5 K bytes from the transmission upper limit established in Step S506 is assigned to a variable "SIZE."

The SIZE variable indicates the remaining amount of data which can be included in one item of e-mail data. It defaults to the value obtained by subtracting 5 K bytes from the transmission upper limit. This value is used as the upper data size limit for one item of e-mail data actually transmitted.

In this way, 5 K bytes is added by default to the e-mail size actually specified by the user. Thus, even if 5 K bytes of "Received:" headers in 600 to 603 are added by intermediary mail servers, the data size limit will not be exceeded.

Incidentally, the 5 K bytes is a margin used to prevent "Received:" headers from causing an overflow. The value of 5 K bytes is obtained empirically. It provides only an example and is not intended to be limiting. Besides, if the margin value is made variable, individual changes in the environment such as changes in the mail transmission route can be accommodated flexibly.

In Step S508, a mail header and body are created. Specifically, this process consists of creating information in 400 to 429 based on the destination information in 303 to 305 as well as information in Subject 306 and Body 307 in FIG. 5. However, the bodies of the second and later parts of divided mail may be empty (0 bytes).

In Step S509, the size of the data created in Step S508 is subtracted from the value of the SIZE variable, and the SIZE variable is updated with the data size remaining after the mail header and body are transmitted.

In Step S510, the images scanned by the scanner 134 are converted into a compression format, image size, and resolution compatible with the receiver to create a multi-page TIFF file. Of course, available formats include not only TIFF, but also MMR and other formats. Incidentally, the images scanned by the scanner 134 are in a predetermined format such as JBIG.

The resulting multi-page TIFF file contains binary data, which must be converted into 7-bit data through BASE64 encoding as shown in 436 to 443 in FIG. 5. The BASE64 encoding is the process of converting 3-byte binary data into 4-byte data. Only data size is determined here, and it is not necessary to actually perform BASE64 conversion. That is, dummy BASE64 encoding in Step S511 is the process of quickly calculating data size obtained when a TIFF binary file is converted as shown in 436 to 443 (see FIG. 5) instead of actually performing BASE64 conversion.

In Step S512, the size of the data calculated in Step S511 through the dummy BASE64 encoding is subtracted from the value of the SIZE variable. In Step S513, the MFP 100 determines whether the SIZE variable is larger than 0. If the SIZE variable is larger than 0, the MFP 100 goes to Step S516*b*, where the MFP 100 determines whether all the pages of the image data to be transmitted have been processed. If all the pages have been processed, the process advances to Step S518. If all the pages have not been processed, the process advances to Step S514 where the next page is subjected to the same processes (Steps S510 to S513) as the preceding page. If the SIZE variable is not larger than 0, the process advances to Step S515.

In Step S515, a point at which the SIZE variable becomes zero and at which the mail should be divided is calculated in terms of page number and byte number; and the calculated divisional point is stored in memory (the RAM 132). The existence of the divisional point indicates that the size of the mail to be transmitted is so large that it is unlikely that the mail will be sent to the counterpart without delivery error unless the mail is divided. By dividing a single piece of mail into multiple parts, it is possible to avoid delivery error more reliably. Upon receiving mail with such divisional points attached, the counterpart (receiving party) can easily understand that the received mail is constituted of other associated mail.

In Step S516, it is determined whether the page just processed is the last page. If the page is not the last page, the process advances to processing of next mail in Step S517 and returns to Step S507.

If the page is the last page, the total number of divisions is calculated based on the Subject field and the setting of "total" in 410, and the process advances to Step S520 in (A) in FIG. 7.

The above is a first image conversion process for determining the divisional points of mail data. Next, description will be given of procedures for actually transmitting mail using the calculated divisional points.

In Step S520, a mail header and body are created. Specifically, this process consists of creating information in 400 to 429 based on the destination information in 303 to 305 as well as information in Subject 306 and Body 307 in FIG. 5. However, the bodies of the second and later parts of divided mail may be empty (0 bytes). Unlike Step S508, based on the total number of pieces of mail calculated in Step S518, the mail header contains information as to how many pieces the original mail has been divided into and which of them is the mail to be transmitted this time.

In Step S521, the MFP 100 transmits the mail header and body out of the mail data.

In Step S522, a multi-page TIFF file is created. Specifically, since the images scanned by the scanner 134 are in a predetermined format such as JBIG, the images are converted into a compression format, image size, and resolution compatible with the receiver.

The resulting multi-page TIFF file contains binary data, which therefore are converted into 7-bit data through BASE64 encoding as shown in 436 to 443 (see FIG. 5) in Step S523.

In Step S525, the MFP 100 transmits part of encoded image data out of the mail data. Specifically, it transmits part (e.g., one line) of data such as shown in 436 to 443 in FIG. 5.

In Step S526, it is determined whether the divisional point of the mail data is found during transmitting the mail data. The divisional points are stored in the RAM 132 as described above. If the divisional point is found, the process returns to Step S520 through Step S529 and repeats similar procedures to send the next piece of the divided mail. If no divisional point is found, the process advances to Step S531.

Incidentally, the mail data (header and body) which is transmitted in Step S521 and mail data (image data) which is transmitted in Step S526 until the divisional point is found constitute one divided mail data (i.e., one of multiple pieces of mail produced by division).

In Step S531, it is determined whether the pages of images corresponding to the mail data transmitted in Step S525 have been transmitted. If they have been transmitted, the process advances to Step S532. If they have not been transmitted, the process returns to Step S525, where it continues transmitting data.

In Step S532, it is determined whether all the pages of images for transmission have been transmitted. If they have, the process advances to Step S530, where it finishes processing. If they have not, the process returns to Step S522 through Step S527 to process the next page of images for transmission.

Through the above processes, the MFP 100 can transmit multiple items of divided mail data to the receiving party by dividing the mail data for transmission.

Advantages of Embodiment

According to this embodiment, the MFP transmits divided mail data using predetermined data size smaller than a transmission upper limit specified by the user before transmission. Consequently, even if intermediary mail servers add "Received:" fields during transmission of divided e-mail, increasing the size of the mail data, the data size limit specified by the user before transmission is not exceeded. This prevents intermediary mail servers from causing communication error due to an excess of data size limit.

Two image conversions are performed for each image page to be transmitted. The image data resulting from the first image conversion are used for calculation of divisional points of mail data without being accumulated in a data recording medium. The image created by the second image conversion is converted into mail data and transmitted without being accumulated in the data recording medium. This eliminates the need for a data recording medium for use to accumulate mail data, and thereby makes it possible to transmit large amounts of mail data reliably as well as to reduce equipment costs.

Furthermore, the image obtained by the first image conversion is used to calculate data size instead of being converted into actual mail data. The image created by the second image conversion is used to create mail data and transmit divided mail. This increases transmission speed.

Besides, the total number of divisions of divided mail is calculated after the first image conversion and is set in the mail data at the time of the second image conversion. This makes it possible to set the total number of divisions in all the divided e-mail transmitted. This allows the recipient of the divided mail to know the total number of divisions, and thereby improves operability.

A margin of 5 K bytes is specified in the SIZE variable so that a transmittable size will not be exceeded even if "Received:" fields are added to mail, increasing the mail size. However, since the size of the margin is determined empirically as described above, if mail is transmitted along a path on which an extremely large number of "Received:" fields are added to the mail, it is likely that the transmittable size will be exceeded. However, note that in most cases the present invention can prevent mail data size from exceeding a transmittable size.

In addition to the use of a fixed value, if the margin value is made variable as described above, that value can be used in various conditions. Specifically, the following approach can be used to make it variable.

(1) Setting a Margin Value by Users
1-1. In addition to the area indicating an upper limit, an area for setting a margin value is provided on the transmission setting screen in FIG. 4 and then users set a margin value in that area.
1-2. A margin value is set for each of e-mail addresses registered on the hard disk 137. In this case, if a plurality of e-mail addresses is specified for a transmission at the same time, the margin value of the destination of e-mail that is set at the largest margin value is used. If an e-mail address is inputted via the control unit 133 directly by a user, a fixed margin value, such a value (5K Byte) as described above, is set.

(2) Setting a Margin Value Automatically
2-1. A margin value is set smaller if the domain name of the e-mail address specified as a destination of transmission indicates the domain where the MFP 100 is located, while a margin value is set larger if the domain name indicates a different domain. Because it is expected that the transmission is executed via a fewer number of mail servers, if the domain name of the specified e-mail address is identical to the domain where the MFP 100 is located, than the number of mail servers used in the case of a different domain.
2-2. When an e-mail from a mail source is received, the number of "Received:" fields is counted with reference to the header of the e-mail, and a margin value is determined based on that number in the case of sending an e-mail to the mail source. Besides sending an e-mail to the mail source, that number (margin) may also be used to send an e-mail to the destination with the same domain as the mail source.

The method to make the margin value variable is not limited to above-mentioned approach, but rather various other methods can be used.

In addition, after sending an e-mail divided in the manner as described above, if an error mail, due to its over-size, is received, the margin value may be made larger and the e-mail is then redivided to be sent again.

Although the example of the way to send an e-mail attached with image data has been described above, the present invention is not limited to it.

In the case of, for example, sending an e-mail with another file than image file, such as a program file, or an e-mail with textual information only, similar processes can be implemented.

Other Embodiment

To implement the processes of the above embodiment, a storage medium containing software program code that embodies the functions of the embodiment may be supplied to a system or apparatus, whose computer (or a CPU or MPU) reads the program code out of the storage medium and executes it to implement the functions. In that case, the program code itself read out of the storage medium will implement the functions of the above embodiment, and the storage medium which stores the program code will constitute the present invention. As the storage medium for supplying the program code, for example, a floppy disk (registered trademark), hard disk, optical disk, magneto-optical disk, or the like may be used. Alternatively, a CD-ROM, CD-R, magnetic tape, non-volatile memory card, ROM, or the like may be used.

The functions of the above embodiment may be implemented not only by the program code read out and executed by the computer, but also by part or all of the actual processing executed, in accordance with instructions from the program code, by an OS (operating system) running on the computer.

Furthermore, the functions of the above embodiment may also be implemented by part or all of the actual processing executed by a CPU or the like contained in a function expansion board inserted in the computer or a function expansion unit connected to the computer if the processing is performed in accordance with instructions from the program code that has been written into memory on the function expansion board or unit from the storage medium.

The present invention is not limited to the above embodiment, and various changes and modifications can be made thereto within the spirit and scope of the present invention. Therefore, to apprise the public of the scope of the present invention, the following claims are made.

This application claims the benefit of Japanese Patent Application No. 2005-063156 filed on Mar. 7, 2005 and Japanese Patent Application No. 2006-035696 filed on Feb. 13, 2006, which are hereby incorporated by reference herein in its entirety.

What is claimed is:
1. A communication apparatus comprising:
a setting unit that sets a first value which is designated by a user as a transmission upper limit of a data size of electronic mail data to be transmitted in a single e-mail;
an obtaining unit that obtains a second value, by automatically subtracting a predetermined margin which is larger than a size of data to be added by a mail server, from the first value designated by the user;
an acquiring unit that acquires image data to be included in electronic mail data;
a generating unit that generates electronic mail data including the image data acquired by the acquiring unit and additional data of a mail header;
a determination unit that determines whether or not a data size of the electronic mail data generated by the generating unit exceeds the second value obtained by the obtaining unit;

a dividing unit that divides the electronic mail data generated by the generating unit into multiple pieces of electronic mail data in a case where it is determined by the determination unit that the data size of the electronic mail data generated by the generating unit exceeds the second value obtained by the obtaining unit, even if the data size of the generated electronic mail data does not exceed the first value designated by the user, wherein a new data size of each piece of electronic mail data resulting from the dividing does not exceed the second value obtained by the obtaining unit, wherein the dividing unit compares the data size of the electronic mail data generated by the generating unit with the second value, and thereby generates divisional points at which the generated electronic mail data should be divided, and wherein the dividing unit calculates a total number of the multiple pieces of the electronic mail data during generation of the divisional points, and adds the total number to each piece of the electronic mail data;

a transmission unit that transmits the electronic mail data in units of each piece of the electronic mail data obtained by the dividing unit;

a non-transitory computer-readable memory that stores computer-executable process steps; and a processor that functions as at least one of the units by executing the computer-executable process steps stored in the memory.

2. The communication apparatus according to claim 1, wherein the acquiring unit acquires the image data by reading an image by a scanner or by receiving e-mail data or facsimile data.

3. A communication method implemented in a communication apparatus, the method comprising:

setting a first value which is designated by a user as a transmission upper limit of a data size of electronic mail data to be transmitted in a single e-mail;

obtaining a second value, by automatically subtracting a predetermined margin which is larger than a size of data to be added by a mail server, from the first value designated by the user;

acquiring image data to be included in the electronic mail data;

generating electronic mail data including the acquired image data and additional data of a mail header;

determining whether or not a data size of the electronic mail data generated in the generating exceeds the second value obtained in the obtaining;

dividing the generated electronic mail data into multiple pieces of electronic mail data in a case where it is determined that the data size of the electronic mail data generated in the generating exceeds the second value obtained by the obtaining, even if the data size of the generated electronic mail data does not exceed the first value designated by the user, wherein a new data size of each piece of electronic mail data resulting from the dividing does not exceed the second value obtained by the obtaining, wherein in the dividing, the data size of the generated electronic mail data is compared with the second value, and thereby divisional points at which the generated electronic mail data should be divided are generated, and wherein in the dividing, a total number of the multiple pieces of the electronic mail data is calculated during generation of the divisional points, and the total number is added to each piece of the electronic mail data; and transmitting the electronic mail data in units of each piece of the electronic mail data.

4. The communication method according to claim 3, wherein in the acquiring, the image data is acquired by reading an image by a scanner or by receiving e-mail data or facsimile data.

5. A non-transitory computer-readable storage medium on which is stored a computer-executable program that, when executed by a computer, implements the communication method according to claim 3.

6. The communication apparatus according to claim 1, wherein the additional data of the mail header includes text data, and the dividing unit regards the data size of the text data as zero after one divisional point is generated.

7. The communication apparatus according to claim 1, wherein the obtaining unit subtracts a different predetermined margin from the first value depending on a destination for the transmission unit.

8. The communication method according to claim 3, wherein the additional data of the mail header includes text data, and in the dividing, the data size of the text data is regarded as zero after one divisional point is generated.

9. The communication method according to claim 3, wherein, in the obtaining, a different predetermined margin is subtracted from the first value depending on a destination to which the generated electronic mail data is to be transmitted.

* * * * *